United States Patent Office 3,733,358
Patented May 15, 1973

3,733,358
ALFA-AMINOOXY-CARBOXYLIC AMIDE DERIVATIVES
Lajos Kisfaludy, Agnes Patthy, nee Lukats, Lajos Dancsi, Gyorgy Fekete, and Istvan Szabo, Budapest, Hungary, assignors to Richter Gedeon Vegyeszeti Gyan Rt., Budapest, Hungary
No Drawing. Filed Dec. 28, 1970, Ser. No. 102,228
Int. Cl. C07c 103/38, 103/30
U.S. Cl. 260—558 A                    4 Claims

ABSTRACT OF THE DISCLOSURE

α-Aminooxy-carboxylic acid amides of tuberculostatic activity, having the general formula

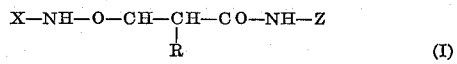

(I)

wherein

X represents hydrogen atom or an acyl group,
R represents hydrogen atom or an unsubstituted or substituted alkyl, aralkyl or aryl group,
Z represents an unsubstituted or substituted alkyl group of 1 to 15 carbon atoms, a cycloalkyl, aryl or aralkyl group, an unsubstituted or substituted aryl group or a heterocyclic radical and their pharmaceutically acceptable acid addition salts.

---

This invention relates to new alfa-aminooxy-carboxylic amide derivatives having tuberculostatic activity, as well as a process for the preparation thereof.

The earliest representative of the alfa-aminooxy carboxylic acids, that is the aminooxy-acetic acid is known since the end of the last century [A. Werner: Ber. 26, 1567 (1893), Ber. 27, 3350 (1894)] but its tuberculostatic activity has been described only 20 years ago [C. B. Favour: J. Bacteriol. 55, 1 (1948)]. In the course of the further investigations some other aminooxy-derivatives have also been prepared [McHale et al.: J. Chem. Soc. 1960, 225; P. Mamalis et al.: J. Chem. Soc. 1960, 229; E. Testa et al.: Helv. Chim. Acta 46, 766 (1963); P. Mamalis et al.: J. Med. Chem. 6, 848 (1965); V. Markova et al.: Khim. Karm. Zh. 3, 13 (1969)] and their microbiological properties have been tested as well [S. A. Price et al.: Brit. J. Pharm. 15, 243 (1960)], but there were not found compounds having a marked activity against *Mycobacterium tuberculosis*.

Now we have found that the new alfa-aminooxy-carboxylic acid derivatives of the general Formula I

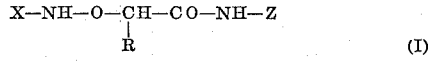

(I)

wherein

X represents hydrogen atom or an acyl group,
R represents hydrogen atom or an unsubstituted or substituted alkyl, aralkyl or aryl group,
Z represents an unsubstituted or substituted alkyl, group of 1 to 15 carbon atoms, a cycloalkyl, aralkyl or aryl group or a heterocyclic radical as well as the pharmaceutically acceptable acid addition salts of the compounds of the general Formula I and/or the optically active isomers of such compounds containing asymmetric carbon atoms possess a very advantageous tuberculostatic activity.

In the majority of the compounds of the general Formula I X represents hydrogen, but X may also stand for an acyl group, which latter may contain in some cases a moiety capable of salt-formation. The compounds of the general Formula I, wherein R stands for hydrogen, are amino-oxyacetic amide derivatives. Those compounds of the general Formula I, wherein R represents a group other than hydrogen, are alpha-aminooxy-carboxylic amide derivatives containing an asymmetric carbon atom, consequently they have optically active isomers. In the majority of the compounds of the general Formula I Z represents an unsubstituted or substituted aromatic group.

There were no data reported in the literature referring to the preparation of the compounds having the general Formula I, not even in the collective report of A. G. Ilvespää and A. Marxer, dealing with the chemistry of substituted hydroxylamine derivatives [Chimia 18, 1 (1964)].

The compounds of the general Formula I can be prepared preferably as described in the followings:

An alfa-aminooxy-carboxylic acid derivative of the general Formula II

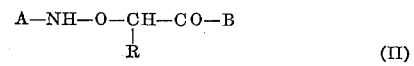

(II)

wherein

A represents an acyl group, or when in the end-product X represents hydrogen atom, A is a radical capable to the temporary protection of the amino group, e.g. a carbobenzoxy or tert. butoxy-carbonyl radical.
R has the same meanings as stated above,
B represents hydroxyl group or a residue of an activated carboxyl group, e.g. a pentachlorophenoxy, halo or N₃ group is reacted with an amine of the general Formula III

(III)

wherein Z has the same meanings as stated above, and the thus-obtained compound of the general Formula IV

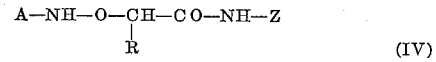

(IV)

wherein A, R and Z have the same meanings as stated above, is converted, optionally after splitting off the protective group in a way known per se, into a compound of the general Formula I, or a pharmaceutically acceptable acid addition salt thereof.

The reaction of the compounds of the general Formulas II and III is carried out in a presence of an organic solvent (preferably dioxane) at room temperature, and the progress of the reaction is monitored by thin layer chromatography. The reaction mixture can be worked up very easily, since both the by-products and the non-reacted starting substances can be separated by extraction, or by treating the mixture with an organic solvent. The thus-obtained compound of the general Formula IV is treated in the next step with a glacial acetic acid solution of hydrobromic acid, or ethylacetate saturated with hydrochloric acid, depending on the character of the protective groups. The thus-obtained salts are practically insoluble in ether, accordingly they can easily be separated, and crystallized from an organic solvent or solvent mixture.

The thus-obtained compounds of the general Formula I can be acylated on their amino group in a way known per se. If an optically active compound of the general Formula II is used as starting material, optically active compounds of the general Formulas IV and I are obtained, their configuration corresponds to that of the starting substance. In those cases, when the starting compound of the general Formula II is optically inactive, the obtained end-products of the general Formula I can be resolved according to usual techniques into their optically active forms.

According to a particularly preferred method, the amino group of the alfa-aminooxy-carboxylic acid derivative of the general Formula II is temporarily protected with a tert. butoxycarbonyl or carbobenzoxy radical, and the carboxyl group of the compounds of the general Formula II is activated with dicyclohexyl carbodiimide, or by converting the free acid into its pentachlorophenyl ester. In this way the compounds of the general Formula IV can be prepared with very good yields; and they can be converted into the end-products of the general Formula I by treating them with an acid. The end-products of the general Formula I are obtained in the form of the free bases or their acid addition salts, depending on the circumstances of the reaction. The salts can be converted into the free base in a way known per se, while the free bases can be converted into their acid addition salts according to known procedures. Among the salts, the pharmaceutically acceptable acid addition salts are preferred.

According to the in vitro pharmacological tests, a great number of the compounds of the general Formula I exert a marked inhibiting activity against the growth of the *Mycobacterium tuberculosis* $H_{37}R_v$ strain, as well as aginst other strains resistant to isonicotinic acid hydrazide, p-amino-salicylic acid and Streptomycin. The inhibiting activity of some anilides is particularly advantageous; the minimal inhibitory concentration of these compounds is below 1 γ/ml.

The compounds of the general Formula I can be administered in the therapy orally and/or parenterally in the form of tablets, coated tablets, injections, infusions or suppositories. The average daily dose in adults is 7 to 50 mg./kg.

The invention is further elucidated by the aid of the following, non-limiting examples.

The melting points have been determined in a Dr. Tottoli type apparatus. The thin layer chromatographical evaluations have been carried out on a "Kieselgel nach Stahl" adsorbent, in a 1:1:8 mixture of n-hexane, glacial acetic acid and chloroform, and the development has been carried out by the $Cl_2$+toluidine method. The structures of the products have been proved by IR and NMR spectroscopy.

EXAMPLE 1

Step (a).—N-tert.butoxycarbonyl-aminooxy-acetic anilide

Method(a1): 8.8 g. (20 mM.) of N-tert.butoxycarbonyl-aminooxy-acetic- acid pentachlorophenyl ester are dissolved in 120 ml. of dry dioxane, thereafter 3.72 ml. (40 mM.) of aniline and 2.8 ml. (20 mM.) of dry triethylamine are added to the solution, and the mixture is allowed to stand at room temperature overnight. The solvent is distilled off under reduced pressure, and the dry residue is treated with a mixture of 100 ml. of ethyl acetate and 20 ml. of 0.1 N hydrochloric acid. The organic solution is washed successively with 3× 20 ml. of 0.1 N hydrochloric acid and 2× 20 ml. of water, dried, and the solvent is distilled off under reduced pressure. The residue is crystallized from ethyl acetate. 4.1 g. (77%) of N-tert.butyloxycarbonyl-aminooxy-acetic anilide are obtained, M.P.: 126–129° C., $R_f$: 0.65.

*Analysis.*—Calculated (percent): C, 58.6; H, 6.8. Found (percent): C, 58.6; H, 6.7.

Method (a2): 2.10 g. (0.011 mM.) of N-tert.butoxycarbonyl-aminooxy-acetic acid are dissolved in 20 ml. of abs. dioxane, and 0.93 ml. (0.01 mM.) of aniline are added to the solution. The mixture is cooled to +10° C., and 2.26 g. (0.1 mM.) of N,N'-dicyclohexyl carbodiimide are added to the mixture with stirring. The mixture is stirred for one hour at +10° C., then for two hours at room temperature. The separated 2.28 g. (94%) of N,N'-dicyclohexyl urea are filtered off, and the filtrate is evaporated under reduced pressure, in a 50° C. water bath. The residue is crystallized from ethyl acetate. 1.91 g. (72%) of N-tert. butoxycarbonyl-aminooxy-acetic anilide are obtained, the product is identical to that obtained in the previous reaction.

Method (a3): 1.91 g. (0.01 mM.) of N-tert.butoxycarbonyl-aminooxyacetic acid are dissolved in 15 ml. of abs. dimethylformamide, and the solution is cooled to −10° C. 1.40 ml. (0.01 mM.) of abs. triethylamine and 1.30 ml. (0.01 mM.) of chlorocarbonic acid isobutyl ester are added to the solution with stirring and cooling, and the mixture is stirred for 15 minutes at −10° C. Thereafter 0.93 ml. (0.01 mM.) of aniline are added. the mixture is allowed to warm to room temperature, and stirred at room temperature for 30 minutes. The mixture is diluted with 40 ml. of water and extracted with 3× 20 ml. of ethyl acetate. The organic phase is dried over sodium sulfate, and evaporated under reduced pressure in a water bath heated to max. 50° C. The residue is crystallized from ethyl acetate. 1.17 g. (44%) of N-tert. butoxycarbonyl-aminooxy-acetic anilide are obtained. The product is identical to the compound obtained in Method (a1).

Step (b).—N-carbobenzoxy-aminooxy-acetic anilide 2.37 g. (5 mM.) of N-carbobenzoxy-aminooxy-acetic acid pentachlorophenyl ester are dissolved in 30 ml. of dioxane, 0.93 ml. (10 mM.) of aniline and 0.70 ml. (5 mM.) of triethylamine are added to the solution, and the mixture is allowed to stand at room temperature overnight. Thereafter the solvent is distilled off under reduced pressure, the residue is dissolved in 25 ml. of ethyl acetate, and the ethyl acetate solution is washed successively with 3× 10 ml. of 1 N hydrochloric acid and 2× 10 ml. of water. The organic solution is dried, and the solvent is distilled off under reduced pressure. The residue is recrystallized from a mixture of ethyl acetate and n-hexane. 1.4 g. (93.5%) of N-carbobenzoxy-aminooxy-acetic anilide are obtained. $R_f$: 0.69.

*Analysis.*—Calculated (percent): C, 64.0; H, 5.4; N, 9.3. Found (percent): C, 64.1; H, 5.5; N, 9.2.

Step (c).—Aminooxy-acetic anilide hydrobromide 1.1 g. (3.7 mM.) of N-carbobenzoxy-aminooxy-acetic anilide are dissolved in 5 ml. of 5 N glacial acetic acid solution of hydrobromic acid. This operation is done with stirring and excluding the moisture of air. After 30 minutes 50 ml. of dry ether are added to the reaction mixture, the separated substance is filtered off and crystallized from a mixture of ethanol and ether. 0.75 g. (83%) of aminooxy-acetic anilide hydrobromide are obtained, M.P.: 143–144° C.

*Analysis.*—Calculated (percent): C, 38.8; H, 4.5; N, 11.3; Br, 32.4. Found (percent): C, 38.7; H, 4.6; N, 11.3; Br, 32.5.

Step (d).—Aminooxy-acetic anilide hydrochloride 2.13 g. (8 mM.) of N-tert.-butoxycarbonyl-aminooxy-acetic anilide are dissolved in dry 4 M ethyl acetate hydrochloric acid, and the mixture is stirred for 30 minutes at room temperature. Abs. ether is added to the mixture, and the separated product is filtered off and recrystallized from a mixture of ethanol and ether. 1.36 g. (84%) of aminooxy-acetic anilide hydrochloride are obtained, M.P.: 166–167° C.

*Analysis.*—Calculated (percent): C, 47.4; H, 5.5; Cl, 17.5. Found (percent): C, 47.5; H, 5.5; Cl, 17.6.

EXAMPLE 2

Step (a).—N-tert.-butoxycarbonyl-aminooxy-acetic acid 2-methoxy-anilide 2.1 g. (11 mM.) of N-tert.-butoxycarbonyl-aminooxy-acetic acid are dissolved in 20 ml. dioxane and 1.12 ml. (10 mM.) of o-anisidine are added to the solution. To the mixture 2.26 g. (11 mM.) of dicyclohexyl carbodiimide are added under cooling, and the mixture is allowed to stand overnight. The separated dicyclohexyl urea is filtered off, and the filtrate is evaporated to dryness under reduced pressure. The residue is crystallized from a mixture of chloroform and n-hexane. 2.2 g. (74%) of N-tert.-butoxycarbonyl-aminooxy-acetic acid 2-methoxy-anilide are obtained, M.P.: 80–82° C., $R_f$: 0.8.

*Analysis.*—Calculated (percent): C, 56.7; H, 6.8. Found (percent): C, 56.7; H, 6.7.

Step (b).—Aminooxy-acetic acid 2-methoxyanilide hydrochloride 2.2 g. of N-tert.-butoxycarbonyl-aminooxy acetic acid 2-methoxyanilide are reacted as described in Example 1 Step (d). 1.40 g. (82%) of aminooxy-acetic acid 2-methoxyanilide hydrochloride are obtained. The product melts at 164–166° C. after recrystallization from a mixture of ethanol and ether.

Analysis.—Calculated (percent): C, 46.4; H, 5.6; Cl, 15.5. Found (percent): C, 46.5; H, 5.7; Cl, 15.2.

EXAMPLE 3

Step (a).—N-tert.-butoxycarbonyl-aminooxy-acetic acid 4-methoxyanilide 2.1 g. of N-tert.-butoxycarbonyl-aminooxy-acetic acid are reacted with 1.23 g. of p-anisidine as described in Example 2 Step (a). 1.74 g. (60%) of N-tert.-butoxycarbonyl-aminooxy-acetic acid 4-methoxyanilide are obtained, M.P.: 107–108° C. (after recrystallization from ethyl acetate), $R_f$: 0.7.

Analysis.—Calculated (percent): C, 56.7; H, 6.8. Found (percent): C, 56.8; H, 6.8.

Step (b).—Aminooxy-acetic acid 4-methoxyanilide hydrochloride 0.52 g. of N-tert.-butoxycarbonyl-aminooxy-acetic acid 4-methoxyanilide are reacted as described in Example 1 Step (d). 0.33 g. (84%) of aminooxy-acetic acid 4-methoxyanilide hydrochloride are obtained, M.P.: 181–182° C.

Analysis.—Calculated (percent): C, 46.4; H, 5.6; Cl, 15.3. Found (percent): C, 46.5; H, 5.6; Cl, 15.4.

EXAMPLE 4

Step (a).—N-tert.-butoxycarbonyl-aminooxy-acetic acid 3-bromoanilide 2.1 g. of N-tert.-butoxycarbonyl-aminooxy-acetic acid are reacted with 1.18 ml. of 3-bromoanilide as described in Example 2 Step (a). 1.9 g. (57%) of N-tert.-butoxycarbonyl-aminooxy-acetic acid 3-bromanilide are obtained, M.P.: 122–124° C. (after recrystallization from ethyl acetate), $R_f$: 0.65.

Analysis.—Calculated (percent): C, 45.4; H, 5.0; Br, 23.1. Found (percent): C, 45.4; H, 5.1; Br, 23.2.

Step (b).—Aminooxy-acetic acid 3-bromoanilide hydrochloride 0.85 g. of N-tert.-butoxycarbonyl-aminooxy-acetic acid 3-bromoanilide are reacted as described in Example 1 Step (d). 3.57 g. (83%) of aminooxy-acetic acid 3-bromoanilide hydrochloride are obtained, M.P.: 151–156° C.

Analysis.—Calculated (percent$_7$): C, 34.1; H, 3.6; Br, 28.4; Cl, 12.6. Found (percent): C, 34.1; H, 3.8; Br, 28.4; Cl, 12.5.

EXAMPLE 5

Step (a).—N-tert.-butoxycarbonyl-aminooxy-acetic acid 4-ethoxyanilide 4.39 g. of N-tert.-butoxycarbonyl-aminooxy-acetic acid pentachlorophenyl ester are reacted with 2.6 ml. of p-phenetidine as described in Example 1 Method (a1). 2.1 g. (68%) of N-tert.-butoxycarbonyl-aminooxy-acetic acid 4-ethoxyanilide are obtained, M.P.: 119–122° C. (recrystallized from ethyl acetate), $R_f$: 0.6.

Analysis.—Calculated (percent): C, 58.0; H, 7.2. Found (percent): C, 58.1; H, 7.2.

Step (b).—N-carbobenzoxy-aminooxy-acetic acid 4-ethoxyanilide 2.0 g. of N-carbobenzoxy-aminooxy-acetic acid pentachlorophenyl ester are reacted with 1.18 ml. of p-phenetidine as described in Example 1 Method (a1). 1.1 g. (77%) of N-carbobenzoxy-aminooxy-acetic acid 4-ethoxyanilide are obtained, M.P.: 105–106° C. (recrystallized from ethyl acetate), $R_f$: 0.7.

Analysis.—Calculated (percent): C, 62.7; H, 5.9; N, 8.1. Found (percent): C, 62.6; H, 5.9; N, 8.2.

Step (c).—Aminooxy-acetic acid 4-ethoxyanilide hydrochloride 1.1 g. of N-tert.-butoxycarbonyl-aminooxy-acetic acid 4-ethoxyanilide are reacted as described in Example 1 Step (d). 0.7 g. (81%) of aminooxy-acetic acid 4-ethoxyanilide hydrochloride are obtained, M.P.: 170–173° C.

Analysis.—Calculated (percent): C, 48.7; H, 6.1; Cl, 14.4. Found (percent): C, 48.7; H, 6.1; Cl, 14.4.

Step (d).—Aminooxy-acetic acid 4-ethoxyanilide hydrobromide 1.0 g. of N-carbobenzoxy-aminooxy-acetic acid 4-ethoxyanilide are reacted as described in Example 1 Step (c). 0.75 g. (89%) of aminooxy-acetic acid 4-ethoxyanilide hydrobromide are obtained, M.P.: 162–166° C. (after recrystallization from a mixture of ethanol and ether).

Analysis.—Calculated (percent): C, 41.2; H, 5.2; Br, 27.5. Found (percent): C, 41.1; H, 5.3; Br, 27.5.

EXAMPLE 6

Step (a).—N-tert.-butoxycarbonyl-aminooxy-acetic acid 4-ethylanilide 4.39 g. of N-tert.-butoxycarbonyl-aminooxy-acetic acid pentachlorophenyl ester are reacted as described in Example 1 Method (a1) with 2.5 ml. of p-ethylaniline. 2.15 g. (73%) of N-tert.-butoxycarbonyl-aminooxy-acetic acid 4-ethylanilide are obtained, M.P.: 100–101° C. (recrystallized from ethyl acetate), $R_f$: 0.8.

Step (b).—Aminooxy-acetic acid 4-ethylanilide hydrochloride 1.43 g. of N-tert.-butoxycarbonyl-aminooxy-acetic acid 4-ethylanilide are reacted as described in Example 1 Step (d). 0.93 g. (82%) of aminooxy-acetic acid 4-ethylanilide hydrochloride are obtained, M.P.: 167–171° C. (after recrystallization from a mixture of ethanol and ether).

Analysis.—Calculated (percent): C, 52.1; H, 6.6; Cl, 15.4. Found (percent): C, 52.3; H, 6.6; Cl, 15.4.

EXAMPLE 7

Step (a).—N-tert.-butoxycarbonyl-aminooxy-acetic acid 4-chloroanilide 8.8 g. of N-tert.-butoxycarbonyl-aminooxy-acetic acid pentachlorophenyl ester are reacted with 5.12 g. of p-chloroaniline as described in Example 1 Method (a1). 4.7 g. (79%) of N-tert.-butoxycarbonyl-aminooxy-acetic acid 4-chloroanilide are obtained, M.P.: 157–159° C. (recrystallized from ethyl acetate), $R_f$: 0.65.

Analysis.—Calculated (percent): C, 52.0; H, 5.7; Cl, 11.8. Found (percent): C, 52.1; H, 5.6; Cl, 11.9.

Step (b).—N-carbobenzoxy-amino-acetic acid 4-chloroanilide 2.37 g. of N-carbobenzoxy-aminooxy-acetic acid pentachlorophenyl ester are reacted with 1.28 g. of p-chloroaniline as described in Example 1 Method (a1). 1.15 g. (69%) of N-carbobenzoxy-aminooxy-acetic acid 4-chloroanilide are obtained, M.P.: 105° C. (after recrystallization from a mixture of ethyl acetate and hexane), $R_f$: 0.68.

Analysis.—Calculated (percent): C, 57.3; H, 4.5; N, 8.45; Cl, 10.6. Found (percent): C, 57.3; H, 4.6; N, 8.4; Cl, 10.5.

Step (c).—Aminooxy-acetic acid 4-chloroanilide hydrochloride 3.55 g. of N-tert.-butoxycarbonyl-aminooxy-acetic acid 4-chloroanilide are reacted as described in Example 1 Step (d). 2.13 g. (79%) of aminooxy-acetic acid 4-chloroanilide hydrochloride are obtained, M.P.: 168–172° C. (after recrystallization from a mixture of ethanol and ether).

*Analysis.*—Calculated (percent): C, 40.5; H, 4.2; Cl, 29.9. Found (percent): C, 40.5; H, 4.2; Cl, 29.9.

Step (d).—Aminooxy-acetic acid 4-chloroanilide hydrobromide 0.5 g. of N-carbobenzoxy-aminooxy-acetic acid 4-chloroanilide are reacted as described in Example 1 Step (c). 0.35 g. (83%) of aminooxy-acetic acid 4-chloroanilide hydrobromide are obtained. M.P.: 160–163° C. (after recrystallization from a mixture of ethanol and ether).

*Analysis.*—Calculated (percent): C, 34.2; H, 3.6; N, 10.0; Br, 28.4; Cl, 12.6. Found (percent): C, 34.0; H, 3.7; N, 10.0; Br, 28.4; Cl, 12.7.

EXAMPLE 8

Step (a).—N-tert.-butoxycarbonyl-aminooxy-acetic acid 2,6-dimethylanilide 4.39 g. of N-tert.-butoxycarbonyl-aminooxy-acetic acid pentachlorophenyl ester are reacted with 2.44 g. of o-xylidine as described in Example 1 Method (a1). 1.15 g. (69%) of N-tert.-butoxycarbonyl-aminooxy-acetic acid 2,6-dimethylanilide are obtained, M.P.: 133–135° C. (recrystallized from ethyl-acetate), $R_f$: 0.58.

*Analysis.*—Calculated (percent): C, 61.2; H, 7.5. Found (percent): C, 61.1; H, 7.5.

Step (b).—Aminooxy-acetic acid 2,6-dimethylanilide hydrochloride 1.65 g. of N-tert.-butoxycarbonyl-aminooxy-acetic acid 2,6-dimethylanilide are reacted as described in Example 1 Step (d). 1.4 g. (81%) of aminooxy-acetic acid 2,6-dimethylanilide hydrochloride are obtained, M.P.: 163–164° C.

*Analysis.*—Calculated (percent): C, 52.1; H, 6.6; Cl, 15.4. Found (percent): C, 52.3; H, 6.7; Cl, 15.3.

EXAMPLE 9

Step (a).—N-carbobenzoxy-aminooxy-acetic acid 4-chlorobenzylamide 2.06 g. (4.3 mM.) of N-carbobenzoxy-aminooxy-acetic acid pentachlorophenyl ester are dissolved in 25 ml. of dry dioxane, and 0.75 ml. (5.5 mM.) of p-chlorobenzylamine are added to the solution. The reaction mixture is allowed to stand for one hour at room temperature, thereafter it is evaporated to dryness under reduced pressure. The residue is dissolved in 25 ml. of ethyl acetate, the ethyl acetate solution is washed successively with 3 × 6 ml. of 1 N hydrochloric acid and 2 × 6 ml. of water, and the solvent is distilled off under reduced pressure. The residue is crystallized from a mixture of abs. ethanol and n-hexane. 1.42 g. (81.7%) of N-carbobenzoxy-aminooxy-acetic acid 4-chlorobenzylamide are obtained, M.P.: 112° C., $R_f$: 0.59.

*Analysis.*—Calculated (percent): C, 58.5; H, 4.9; N, 8.1; Cl, 10.15. Found (percent): C, 58.5; H, 5.1; N, 8.1; Cl, 10.2.

Step (b).—Aminooxy-acetic acid 4-chlorobenzylamide hydrobromide 1.0 g. of N-carbobenzoxy-aminooxy-acetic acid 4-chlorobenzylamide are reacted as described in Example 1 Step (c). 0.8 g. (94%) of aminooxy-acetic acid 4-chlorobenzylamide hydrobromide are obtained, M.P.: 147–148° C.

*Analysis.*—Calculated (percent): C, 36.3; H, 4.1; N, 9.5; Cl, 12.0; Br, 27.1. Found (percent): C, 36.3; H, 4.2; N, 9.4; Cl, 12.1; Br, 27.1.

EXAMPLE 10

Step (a).—N-carbobenzoxy-aminooxy-acetic acid benzylamide 1.75 g. of N-carbobenzoxy-aminooxy-acetic acid pentachlorophenyl ester are reacted with 0.47 ml. of benzylamine as described in Example 1 Method (a1). 1.0 g. (88%) of N-carbobenzoxy-aminooxy-acetic acid benzylamide is obtained, M.P.: 87–88° C. (recrystallized from ethyl acetate), $R_f$: 0.63.

*Analysis.*—Calculated (percent): C, 65.0; H, 5.8; N, 8.9. Found (percent): C, 65.0; H, 5.8; N, 8.9.

Step (b).—Aminooxy-acetic acid benzylamide hydrobromide 0.6 g. of N-carbobenzoxy-aminooxy-acetic acid benzylamide are dissolved in 3 ml. of a 3.5 M glacial acetic acid hydrobromic acid solution with stirring. After 30 minutes the product is precipitated with 30 ml. of dry ether. The product is recrystallized from a mixture of dry ethanol and ether. 0.46 g. (88%) of aminooxy-acetic acid benzylamide hydrobromide are obtained, M.P.: 135–136° C.

*Analysis.*—Calculated (percent): C, 41.5; H, 5.0; N, 10.8; Cl, 30.6. Found (percent): C, 41.6; H, 5.1; N, 10.7; Cl, 30.7.

EXAMPLE 11

Step (a).—N-tert.-butoxycarbonyl-aminooxy-acetic acid cyclopentylamide 4.39 g. (10 mM.) of N-tert.-butoxycarbonyl-aminooxy-acetic acid pentachlorophenyl ester are dissolved in 50 ml. of dioxane, 1.7 g. (20 mM.) of cyclopentylamine are added to the solution, and the mixture is allowed to stand overnight. The solvent is evaporated under reduced pressure, the residue is dissolved in 40 ml. of ethyl acetate, and the ethylacetate solution is washed successively with 3 × 10 ml. of 1 N hydrochloric acid and 10 ml. of water. The organic solution is dried, the solvent is evaporated under reduced pressure, and the residue is crystallized from ethylacetate. 1.75 g. (68%) of N-tert.-butyloxycarbonyl-aminooxy-acetic acid cyclopentylamide are obtained, M.P.: 163–168° C. $R_f$: 0.45.

*Analysis.*—Calculated (percent): C, 55.75; H, 8.6. Found (percent): C, 55.8; H, 8.7.

Step (b).—Aminooxy-acetic acid cyclopentylamide hydrochloride 0.75 g. of N-tert.-butoxycarbonyl-aminooxy-acetic acid cyclopentylamide are reacted as described in Example 1 Step (d). 0.43 g. (77%) of aminooxy-acetic acid cyclopentylamide hydrochloride are obtained. The product is a very hygroscopic, white, crystalline substance.

EXAMPLE 12

Step (a).—N,N'-di-(N"-carbobenzoxy-aminooxyacetyl)-ethylenediamine 14.2 g. (30 mM.) of N-carbobenzoxy-aminooxy-acetic acid pentachlorophenyl ester are dissolved in 175 ml. of dioxane, thereafter 1.15 ml. (15 mM.) of ethylenediamine and 4.15 ml. (30 mM.) of abs. triethylamine are added to the solution with stirring and cooling. The reaction mixture is stirred for one hour at room temperature, then it is filtered, and the filtrate is evaporated to dryness under reduced pressure. The residue is dissolved in 120 ml. of ethylacetate, and the ethyl acetate solution is washed successively with 3 × 40 ml. of 1 N hydrochloric acid and 2 × 20 ml. of water. Thereafter the product is extracted from the organic solution with 3 × 40 ml. of 2 N sodium hydroxide solution, and the pH of the aqueous phase is adjusted to 7. The separated oily substance is transferred into 3 × 40 ml. of ethyl acetate, the organic solution is dried, and the solvent is evaporated under reduced pressure. 9.5 g. (67%) of a chromatographically uniform oily substance are obtained, $R_f$: 0.22.

*Analysis.*—Calculated (percent): C, 55.7; H, 5.5. Found (percent): C, 55.7; H, 5.6.

Step (b).—N,N'-di-(aminooxy-acetyl)-ethylenediamine.2HBr 0.70 g. of N,N' - di - (N'' - carbobenzoxy-aminooxy-acetyl)-ethylenediamine are reacted as described in Example 1 Step (c). 0.40 g. (73%) of N,N'-di-(aminooxy-acetyl)-ethylenediamine.2HBr are obtained, M.P.: 176–177° C.

*Analysis.*—Calculated (percent): C, 19.6; H, 4.2; N, 15.2; Br, 43.5. Found (percent): C, 19.8; H, 4.2; N, 15.1; Br, 43.5.

EXAMPLE 13

Step (a).—N,N'-di-(N''-tert.-butoxycarbonyl-aminooxy-acetyl)-benzidine 8.8 g. (20 mM.) of N-tert.-butoxycarbonyl-aminooxy-acetic acid pentachlorophenyl ester are dissolved in 50 ml. of abs. dimethylformamide, and 2.57 g. (10 mM.) of benzidine dihydrochloride and 2.8 ml. (20 mM.) of abs. triethylamine are added to the solution. The reaction mixture is allowed to stand overnight. The separated salt is filtered off, the filtrate is evaporated under reduced pressure, and the residue is crystallized from ethyl acetate. 6.6 g. (62%) of N,N'-di-(N''-tert.-butyloxy-carbonyl-aminooxy-acetyl)-benzidine are obtained, M.P.: 159–161° C., $R_f$: 0.28.

*Analysis.*—Calculated (percent): C, 58.9; H, 6.5. Found (percent): C, 58.9; H, 6.6.

Step (b).—N,N'-di-(aminooxy-acetyl)benzidine.2HCl 3.0 g. of N,N'-di-(N''-tert.-butoxycarbonyl-aminooxy-acetyl)-benzidine are reacted as described in Example 1 Step (d). 2.2 g. (96%) of N,N'-di-(aminooxy-acetyl)-benzidine dihydrochloride are obtained, M.P.: 260–263° C. (after recrystallization from a mixture of methanol and ether).

*Analysis.*—Calculated (percent): C, 47.6; H, 5.0; Cl, 17.6. Found (percent): C, 47.5; H, 5.1; Cl, 17.6.

EXAMPLE 14

Step (a).—N-tert.-butoxycarbonyl-aminooxy-acetic acid 3-pyridylamide 2.1 g. (11 mM.) of N-tert.-butoxycarbonyl-aminooxy-acetic acid are dissolved in 20 ml. of dioxane and 0.94 g. of (10 mM.) of 3-amino-pyridine are added to the solution. 2.26 g. (11 mM.) of dicyclohexyl carbodiimide are added to the above mixture under cooling, and the mixture is allowed to stand overnight. The separated 2.29 g. (94%) of dicyclohexyl urea are filtered off, and the filtrate is evaporated to dryness under reduced pressure. The residue is dissolved in 30 ml. of ethyl acetate, and the solution is washed with 2× 10 ml. of 1 M NaHCO₃ solution and water. The organic solution is dried and evaporated to dryness under reduced pressure. The residue is crystallized from ethyl acetate. 1.5 g. (63%) of N-tert.-butoxycarbonyl-aminooxy-acetic acid 3-pyridylamide are obtained, M.P.: 117–123° C., $R_f$: 0.63.

*Analysis.*—Calculated (percent): C, 54.0; H, 6.4. Found (percent): C, 54.0; H, 6.6.

Step (b).—Aminooxy-acetic acid 3-pyridylamide dihydrochloride 0.36 g. of N-tert.-butoxycarbonyl-aminooxy-acetic acid 3-pyridylamide are reacted as described in Example 1 Step (d). 0.3 g. (93%) of aminooxy-acetic acid 3-pyridylamide dihydrochloride are obtained, M.P.: 184–186° C. (after recrystallization from a mixture of ethanol and ether).

*Analysis.*—Calculated (percent): C, 35.0; H, 4.7; Cl, 29.5. Found (percent): C, 35.1; H, 4.8; Cl, 29.4.

EXAMPLE 15

Step (a).—N-(N'-tert.-butoxycarbonyl-aminooxy-acetyl)-aminooxy-acetic anilide 1.4 g. (7 mM.) of aminooxy-acetic anilide hydrochloride are dissolved in 25 ml. of dimethylformamide, then 0.97 ml. (7 mM.) of triethylamine are added to the solution with stirring and cooling. The solution is stirred for 15 minutes, the separated triethylamine salt is filtered off, 3.08 g. (7 mM.) of N-tert.-butoxycarbonyl-aminooxy-acetic acid pentachlorophenyl ester are added to the filtrate, and the mixture is allowed to stand overnight. The solvent is distilled off under reduced pressure, and the residue is crystallized from ethyl acetate. 1.45 g. (65%) of N - (N'-tert.-butoxycarbonyl-aminooxy-acetyl)-aminooxy-acetic anilide are obtained, M.P.: 113–117° C., $R_f$: 0.52.

*Analysis.*—Calculated (percent): C, 53.1; H, 6.2. Found (percent): C, 53.2; H, 6.3.

Step (b).—N-(aminooxy-acetyl)-aminooxy-acetic anilide hydrochloride 0.33 g. of N - (N' - tert.-butoxycarbonyl-aminooxy-acetyl)-aminooxy-acetic anilide are reacted as described in Example 1 Step (d). 0.24 g. (87%) of N-(aminooxy-acetyl)-aminooxy-acetic anilide hydrochloride are obtained, M.P.: 108–116° C. (after recrystallization from a mixture of ethanol and ether).

*Analysis.*—Calculated (percent): C, 43.7; H, 5.1; Cl, 12.8. Found (percent): C, 43.7; H, 5.2; Cl, 12.9.

EXAMPLE 16

Step (a).—N-(N'-carbobenzoxy-glycyl)-aminooxyacetic anilide 1.4 g. (7 mM.) of aminooxy-acetic anilide hydrochloride are dissolved in 25 ml. of abs. dimethylformamide, and 0.97 ml. of abs. triethylamine and 3.2 g. (7 mM.) of N-carbobenzoxy-glycin pentachlorophenyl ester are added to the solution with stirring. The reaction mixture is allowed to stand overnight, then the separated triethylamine salt is filtered off, and the filtrate is evaporated to dryness under reduced pressure. The residue is crystallized from ethyl acetate. 2.1 g. (84%) of N-(N'-carbobenzoxy-glycyl)-aminooxy-acetic anilide are obtained, M.P.: 115–117° C., $R_f$: 0.41.

*Analysis.*—Calculated (percent): C, 60.6; H, 5.4; N, 11.7. Found (percent): C, 60.4; H, 5.6; N, 11.4.

Step (b).—N-(glycyl)-aminooxy-acetic anilide hydrobromide 1.85 g. of N-(N'-carbobenzoxy-glycyl)-aminooxy-acetic anilide are reacted as described in Example 1 Step (c). 1.19 g. (75%) of N-(glycyl)-aminooxy-acetic anilide hydrobromide are obtained. M.P.: 125–128° C.

*Analysis.*—Calculated (percent): C, 39.5; H, 4.6; Br, 26.2. Found (percent): C, 39.5; H, 4.8; Br, 26.3.

EXAMPLE 17

N-acetyl-aminooxy-acetic anilide 1.40 g. (7 mM.) of aminooxy-acetic anilide hydrochloride are dissolved in 20 ml. of pyridine, and 0.97 ml. of triethylamine are added to the solution under cooling. The separated triethylamine salt is filtered off, and 0.57 ml. (8 mM.) of acetylchloride are added to the filtrate with stirring and cooling. The mixture is stirred for one hour at 0° C., then it is poured on 60 g. of ice, and the mixture is acidified. The acidic mixture is extracted with 4× 20 ml. of ethyl acetate, the ethyl acetate solution is dried, and the solvent is distilled off under reduced pressure. The residue is crystallized from ethyl acetate. 1.05 g. (72%) of N-acetyl-aminooxy-acetic anilide are obtained, M.P.: 142–144° C. $R_f$: 0.2.

*Analysis.*—Calculated (percent): C, 57.7; H, 5.8. Found (percent): C, 57.7; H, 5.9.

EXAMPLE 18

Step (a).—N-tert.-butoxycarbonyl-alfa-aminooxy-beta-phenyl-propionic anilide

Method (a1): 3.28 g. (6.2 mM.) of N-tert.-butoxycarbonyl-alfa-aminooxy-beta-phenyl-propionic acid pentachlorophenyl ester are dissolved in 20 ml. of abs. dimethylformamide, and 1.15 ml. (12.4 mM.) of aniline and 0.86 ml. (6.2 mM.) of abs. triethylamine are added to the solution. The reaction mixture is allowed to stand overnight. The solvent is evaporated under reduced pressure, the residue is dissolved in 50 ml. of ethyl acetate, and the solution is washed successively with 3× 10 ml. of 1 N hydrochloric acid and water. The organic solution is dried and evaporated under reduced pressure. The residue is crystallized from ethyl acetate, 1.65 g. (74%) of N - tert. - butoxycarbonyl - alfa-aminooxy-beta-phenyl-propionic anilide are obtained, M.P.: 140–141° C., $(\alpha)_D^{25} = +162°$ (c.=1, ethanol), $R_f$: 0.8.

*Analysis.*—Calculated (percent): C, 67.4; H, 6.8; N, 7.9. Found (percent): C, 67.3; H, 6.6; N, 8.0.

Method (a2): 2.81 g. (10 mM.) of N-tert.-butoxycarbonyl-alfa-aminooxy-beta-phenyl-propionic acid and 0.93 ml. (10 mM.) of aniline are dissolved in 20 ml. of dioxane, and 2.06 g. (10 mM.) of dicyclohexyl carbodiimide are added to the solution with stirring and cooling. The reaction mixture is allowed to stand overnight, the separated dicyclohexyl urea is filtered off, and the filtrate is evaporated to dryness under reduced pressure. The residue is dissolved in 25 ml. of ethyl acetate, the solution is washed successively with 3× 5 ml. of 1 N hydrochloric acid, 3× 5 ml. of 1 M sodiumbicarbonate solution and water, then it is dried, and the solvent is evaporated under reduced pressure. The residue is crystallized from ethylacetate. 1.76 g. of product are obtained, which is identical to the compound obtained in Method (a1).

Step (b).—Alfa-aminooxy-beta-phenyl-propionic anilide hydrochloride 0.65 g. of N-tert.-butoxycarbonyl-alfa-aminooxy-beta-phenyl-propionic anilide are reacted as described in Example 1 Step (d). 0.43 g. (83%) of alfa-aminooxy-beta-phenyl-propionic anilide hydrochloride are obtained, M.P.: 166–168° C., $(\alpha)_D^{25} = +28.7°$ (c.=1, ethanol).

*Analysis.*—Calculated (percent): C, 61.6; H, 5.8; Cl, 12.1. Found (percent): C, 61.5; H, 5.9; Cl, 12.1.

EXAMPLE 19

Step (a).—N-tert.-butoxycarbonyl-alfa-aminooxy propionic anilide 2.05 g. (10 mM.) of N-tert.-butoxycarbonyl-alfa-aminooxy-propionic acid and 0.93 ml. (10 mM.) of aniline are dissolved in 20 ml. of abs. dioxane, then 2.06 g. of dicyclohexyl carbodiimide are added to the solution with stirring and cooling. The reaction mixture is allowed to stand at room temperature for 16 hours. The separated dicyclohexyl urea is filtered off, the solvent is distilled off under reduced pressure, and the residue is dissolved in 25 ml. of ethyl acetate. The ethyl acetate solution is washed successively with 3× 5 ml. of 1 N hydrochloric acid, 3× 5 ml. of 1 M sodium bicarbonate solution and water, dried, and evaporated under reduced pressure. The residue is crystallized from a mixture of chloroform and hexane. 1.7 g. (61%) of N-tert.-butoxycarbonyl-alfa-aminooxy-propionic anilide are obtained, M.P.: 92° C., $R_f$: 0.71, $(\alpha)_D^{25} = +102.5°$ (c.=1, ethanol).

*Analysis.*—Calculated (percent): C, 60.0; H, 7.2; N, 10.0. Found (percent): C, 59.9; H, 7.3; N, 10.2.

Step (b).—Alfa-aminooxy-propionic anilide hydrochloride 0.56 g. of N-tert.-butoxycarbonyl-alfa-aminooxy-propionic anilide are reacted as described in Example 1 Step (d). 0.37 g. (86%) of alfa-aminooxy-propionic anilide hydrochloride are obtained, M.P. 165–168° C. (recrystallized from a mixture of ethanol and ether), $$(\alpha)_D = +133.5°$$

(c.=1, ethanol).

*Analysis.*—Calculated (percent): C, 49.9; H, 6.0; Cl, 16.4. Found (percent): C, 49.9; H, 6.2; Cl, 16.5.

EXAMPLE 20

Alfa-aminooxy-propionic acid p-chloroanilide hydrochloride 2.05 g. (0.010 M) of alfa-tert.-butoxycarbonyl-aminooxy-propionic acid are dissolved at room temperature in 30 ml. of abs. ethyl acetate, and 1.28 g. (0.010 M) of p-chlor-aniline are added to the solution. The mixture is cooled to 0° C., and 2.06 g. (0.010 M) of N,N'-dicyclohexylcarbodiimide are added. The cooling bath is removed and the mixture is allowed to stand at room temperature for 16 hours. The separated N,N'-dicyclohexyl urea is filtered off [2.14 g. (96%) of dry dicyclohexyl urea are obtained], and the filtrate is evaporated under reduced pressure in a water bath heated to 50° C. The obtained 2.90 g. (92%) of an oily substance is treated at room temperature with 15 ml. of a 4.0 M abs. ethyl acetate solution of hydrochloric acid. The mixture is stirred for 30 minutes, and the moisture of air is excluded. Thereafter 45 ml. of dry diethyl ether are added to the mixture, the separated crystals are filtered off, washed with diethyl ether, dried, and recrystallized from a mixture of abs. ethanol and diethyl ether. The recrystallization process is carried out as follows: the crude product is dissolved in boiling ethanol, the solution is cooled to 30° C., and an equal volume of diethyl ether is added to the solution. The purified product is dried. 2.03 g. (81%) of alfa-aminooxy-propionic acid p-chloroanilide hydrochloride are obtained, M.P. 177–180° C. $(\alpha)_D^{28} = +115.0°$ (c=1, ethanol).

*Analysis.*—Calculated (percent): C, 43.0; H, 4.8; Cl, 28.2. Found (percent): C, 43.1; H, 4.8; Cl, 28.2.

EXAMPLE 21

Aminooxy-acetic acid p-hydroxyanilide hydrobromide 4.50 g. (0.020 M) of N-benzyloxycarbonyl-aminooxy acetic acid are dissolved in 34 ml. of abs. diethyl ether, the solution is cooled to 0° C., and 5.0 g. (0.022 M) of phosphorous pentachloride are added to the solution with stirring and excluding the moisture of air. The mixture is stirred for additional 30 minutes at a temperature between 0 and +5° C., during this period almost completely homogeneous mixture is obtained. The small quantity of insoluble material is filtered off, and the filtrate is evaporated under reduced pressure in a water bath heated to max. +10° C. The residue is triturated with 15 ml. of n-hexane, then the solvent is evaporated as described above, and this procedure is repeated once more. 4.85 g. (100%) of an oily residue are obtained. The residue is dissolved in 40 ml. of abs. chloroform at room temperature, 2.13 g. (0.0195 M) of p-aminophenol are added to the solution, thereafter 30 ml. of 1 M sodium bicarbonate solution are added, and the heterogeneous mixture is vigorously stirred for 2 hours at room temperature. The organic phase is separated from the aqueous layer, washed successively with 3× 7 ml. of 1 N hydrochloric acid, 10 ml. of water, 3× 7 ml. of 1 M sodium bicarbonate solution and 10 ml. of water, dried over anhydrous sodium sulfate, and the solvent is distilled off under reduced pressure in a water bath heated to 40° C. The residue is dissolved in hot ethyl acetate, and an equal volume of n-hexane is added to the solution. The mixture is cooled, the separated crystals are filtered off, and dried in air. 2.90 g. (47%) of N-benzyloxycarbonyl-aminooxy-acetic acid p-hydroxyanilide are obtained, M.P. 115–117° C. 15 ml. of a 4 M glacial acetic acid solution of hydrobromic acid are added to the above product, and the mixture is stirred for 30 minutes at room temperature. During this operation the moisture of air is excluded. 150 ml. of abs. diethyl ether are added to the mixture, the separated crystals are filtered off, washed with diethyl ether, and dried in a vacuum desiccator over phosphorous pentoxide. The crude product is recrystallized from ethanol and diethylether as described above. 1.95 g. (38.2%) of aminooxy-acetic acid p-hydroxy-anilide hydrobromide are obtained, M.P. 175–177° C.

*Analysis.*—Calculated (percent): C, 36.5; H, 4.2; Br. 30.4. Found (percent): C, 36.5; H, 4.3; Br, 30.3.

EXAMPLE 22

Step (a).—Alfa-N-tert.-butoxycarbonyl-aminooxy-beta-phenyl-propionic acid isopropylamide 3.08 g. (0.011 M) of alfa-N-tert.-butoxycarbonyl-aminooxy-beta-phenyl-propionic acid are dissolved in 40 ml. of abs. dioxane at room temperature with stirring, and 0.87 ml. (0.01 M) of isopropylamine are added to the solution The mixture is cooled with ice water, and 2.26 g. (0.011 M) of N,N'-dicylohexyl carbodiimide are added. The mixture is allowed to stand at room temperature for 16 hours. The separated 2.34 g. (96%) of N,N'-dicyclohexyl urea are filtered off, and the filtrate is evaporated under reduced pressure in a water bath heated to 50° C. The residue is dissolved in 30 ml. of ethylacetate, and the solution is extracted successively with 3× 7 ml. of 1 M sodium bicarbonate solution, 10 ml. of water, 3× 7 ml. of 1 N hydrochloric acid and 10 ml. of water. The organic layer is dried over sodium sulfate and evaporated in vacuo. The residue is recrystallized from a 1:1 mixture of ethylacetate and n-hexane, the solids are filtered off and dried in air. 2.22 g. (69%) of alfa-N-tert.-butoxycarbonyl aminooxy-beta-phenyl-propionic acid isopropylamide are obtained, M.P. 100–101° C. $(\alpha)_D^{28} = +62.5°$ (c.=1.2, ethanol), $R_f$: 0.85 (developing mixture: ethyl acetate:pyridine:glacial acetic acid:water 30:2.5:0.75:1.4, adsorbent: silica gel).

*Analysis.*—Calculated (percent): C, 63.4; H, 8.1; N, 8.7. Found (percent): C, 63.4; H, 8.1; N, 8.7.

Step (b).—Alfa-aminooxy-beta-phenyl-propionic acid isopropylamide hydrochloride 0.60 g. (0.0019 M) of alfa-N-tert.-butoxycarbonyl-aminooxy-beta-phenyl-propionic acid isopropylamide are dissolved in 3.04 ml. of a 4.0 M ethyl acetate solution of hydrochloric acid, and the solution is stirred for 20 minutes at room temperature with excluding the moisture of air. Thereafter 15 ml. of abs. diethyl ether are added, the separated crystals are filtered off, and recrystallized from a mixture of ethanol and diethyl ether. The purified product is dried. 0.43 g. (88%) of alfa-aminooxy-beta-phenyl-propionic acid isopropylamide hydrochloride are obtained, M.P.: 147–148° C., $(\alpha)_D^{28} = +28.0°$ (c.=1, methanol).

*Analysis.*—Calculated (percent): C, 55.6; H, 7.4; Cl, 13.7. Found (percent): C, 55.5; H, 7.6; Cl, 13.6.

EXAMPLE 23

Step (a).—N-benzyloxycarbonyl-aminooxy-acetic acid-4-nitroanilide 4.50 g. (0.020 M) of N-benzyloxycarbonyl-aminooxy-acetic acid are converted to the corresponding acid chloride as described in Example 21, and the acid chloride is dissolved in 20 ml. of ethyl acetate. The solution is cooled to 0° C., and 2.07 g. (0.015 M) of p-nitroaniline and 5.0 ml. of pyridine are added to the solution. The mixture is stirred for 30 minutes at 0° C., then for 60 minutes at 20° C. The mixture is diluted with 20 ml. of water, stirred for 10 minutes at room temperature, the organic layer is separated, washed with 3× 10 ml. of 1 M sodium bicarbonate solution and 10 ml. of water, dried over anhydrous sodium sulfate, and the solvent is distilled off under reduced pressure in a water bath heated to 40° C. The residue is recrystallized from a mixture of ethanol and petroleum ether. 2.70 g. (52.5%) of N-benzoyloxycarbonyl-aminooxy-acetic acid-4-nitroanilide are obtained, M.P.: 104–105° C., $R_f$: 0.47.

*Analysis.*—Calculated (percent): C, 55.7; H, 4.4; N, 11.2. Found (percent): C, 55.6; H, 4.6; N, 11.3.

Step (b).—Aminooxy-acetic acid 4-nitroanilide hydrobromide 2.40 g. (0.007 M) of N-benxyloxycarbonyl-aminooxy-acetic acid 4-nitroanilide are treated with 12 ml. of a 4 M glacial acetic acid solution of hydrobromic acid as described in Example 1 Step (c). The reaction mixture is worked up as described in the cited example. 1.90 g. (93%) of aminooxy-acetic acid-4-nitroanilide hydrobromide are obtained, M.P.: 190° C., $R_f$: 0.37.

*Analysis.*—Calculated (percent): C, 32.9; H, 3.4; N, 14.4; Br, 27.4. Found (percent): C, 32.7; H, 3.5; N, 14.3; Br, 27.4.

EXAMPLE 24

Step (a).—N-benzyloxycarbonyl-aminooxy-acetic acid 4-ethoxycarbonylanilide 4.50 g. (0.020 M) of N-benzyloxycarbonyl-aminooxy-acetic acid are converted to the corresponding acid chloride as described in Example 21, and the obtained acid chloride is dissolved in 20 ml. of ethyl acetate. The solution is reacted with 2.48 g. (0.015 M) of 4-ethoxycarbonyl-anilide as described in Example 23, the working up of the reaction mixture is also the same. 2.86 g. (51.7%) of N-benzyloxycarbonyl-aminooxy-acetic acid 4-ethoxycarbonyl-anilide are obtained, M.P.: 102–103° C., $R_f$: 0.65.

*Analysis.*—Calculated (percent): C, 61.3; H, 5.4; N, 7.5. Found (percent): C, 61.3; H, 5.4; N, 7.6.

Step (b).—Aminooxy-acetic acid 4-ethoxycarbonyl-anilide hydrobromide 1.40 g. (0.0038 M) of N-benzyloxycarbonyl-aminooxy-acetic acid 4-ethoxycarbonylanilide are reacted with 7.0 ml. of a 4 M glacial acetic acid solution of hydrobromic acid as described in Example 1 Step (c). 1.07 g. (88.5%) of aminooxy-acetic acid 4-ethoxycarbonylanilide hydrobromide are obtained, M.P.: 188° C.

*Analysis.*—Calculated (percent): C, 41.4; H, 4.7; N, 8.8; Br, 25.1. Found (percent): C, 41.3; H, 4.7; N, 8.7; Br, 25.0.

EXAMPLE 25

Step (a).—DL-alfa-N-tert.-butoxycarbonyl-aminooxy-propionic acid p-ethylanilide 2.20 g. (0.0107 M) of DL-alfa-N-tert.-butoxycarbonyl-aminooxy-propionic acid, 2.21 g. (0.0107 M) of N,N'-dicyclohexylcarbodiimide, and 1.30 g. (0.0107 M) of p-ethylaniline are reacted as described in Example 1 Method (a2). The working up of the reaction mixture is also the same. 2.61 g. (79%) of DL-alfa-N-tert.-butoxycarbonyl-aminooxy-propionic acid p-ethyl-anilide are obtained, M.P.: 128–130° C., $R_f$: 0.68.

*Analysis.*—Calculated (percent): C, 62.5; H, 7.8; N, 9.1. Found (percent): C, 62.4; H, 7.9; N, 9.0.

Step (b).—DL-alfa-aminooxy-propionic acid p-ethylanilide hydrochloride 1.60 g. (0.0052 M) of DL-alfa-N-tert.-butoxycarbonyl-aminooxy-propionic acid p-ethylanilide are reacted with 8.0 ml. of a 4 M ethyl acetate solution of hydrochloric acid as described in Example 1 Step (d). The working up of the reaction mixture is also the same. 1.00 g. (78.5%) of DL-alfa-aminooxy-propionic acid p-ethylanilide hydrochloride are obtained, M.P.: 164–165° C.

*Analysis.*—Calculated (percent): C, 54.0; H, 7.0; N, 11.4; Cl, 14.5. Found (percent): C, 54.1; H, 6.9; N, 11.3; Cl, 14.6.

EXAMPLE 26

Step (a).—Alfa-tert.-butoxycarbonyl-aminooxy-propionic acid-2-methoxyanilide 2.27 g. (0.011 M) of alfa-N-tert.-butoxycarbonyl-aminooxypropionic acid, 2.26 g. (0.011 M) of N,N'-dicyclohexyl carbodiimide and 1.12 ml. (0.010 M) of o-anisidine are reacted as described in Example 1 Method (a2). The working up of the reaction mixture is also the same. 2.53 g. (81.5%) of alfa-N-tert.-butoxycarbonyl-aminooxy-propionic acid-2-methoxyanilide are obtained, M.P.: 84–85° C. $(\alpha)_D^{28} = +89°$ (c.=1, ethanol), $R_f$: 0.71.

Analysis.—Calculated (percent): C, 58.0; H, 7.1; N, 9.0. Found (percent): C, 57.9; H, 7.2; N, 8.9.

Step (b) Alfa-aminooxy-propionic acid-2-methoxyanilide hydrochloride 0.62 g. (0.002 M) of alfa-N-tert.-butoxycarbonyl-aminooxypropionic acid-2-methoxyanilide are treated with 4.0 ml. of ethyl acetate hydrochloric acid as described in Example 1 Step (d). 0.42 g. (86%) of alfa-aminooxy-propionic acid-2-methoxyanilide hydrochloride are obtained M.P.: 102–103° C. $(\alpha)_D^{28} = +75.7°$ (c.=1, ethanol).

Analysis.—Calculated (percent): C, 48.7; H, 6.1; Cl, 14.4. Found (percent): C, 48.6; H, 6.2; Cl, 14.5.

EXAMPLE 27

Step (a).—Alfa-N-tert.-butoxycarbonyl-aminooxy-beta-phenylpropionic acid-2-methoxyanilide 3.08 g. (0.011 M) of alfa-N-tert.-butoxycarbonyl-aminooxy-beta-phenyl-propionic acid, 2.26 g. (0.011 M) of N,N'-dicyclohexyl carbodiimide and 1.12 ml. (0.010 M) of o-anisidine are reacted as described in Example 1 Method (a2). The working up of the reaction mixture is also the same. 2.89 g. (75%) of alfa-N-tert.-butoxycarbonyl-aminooxy-beta-phenyl-propionic acid-2-methoxy - anilide are obtained, M.P.: 122–124° C. $(\alpha)_D^{25} = +113°$ (c.=1, ethanol), $R_f$: 0.78.

Analysis.—Calculated (percent): C, 65.4; H, 6.8; N, 7.1. Found (percent): C, 65.3; H, 6.9; N, 7.0.

Step (b).—Alfa-aminooxy-beta-phenyl-propionic acid-2-methoxyanilide hydrochloride 2.71 g. (0.007 M) of alfa-N-tert.-butoxycarbonyl-aminooxy-beta-phenyl-propionic acid - 2 - methoxyanilide are treated with 15 ml. of a 4 M ethyl acetate solution of hydrochloric acid as described in Example 1 Step (d). The working up of the reaction mixture is also the same. 1.85 g. (82.5%) of alfa-aminooxy-beta-phenyl-propionic acid-2-methoxyanilide hydrochloride are obtained, M.P.: 143–145° C. $(\alpha)_D^{28} = +63.5°$ (c.=1, ethanol).

Analysis.—Calculated (percent): C, 59.6; H, 5.9; Cl, 11.0. Found (percent): C, 58.7; H, 6.0; Cl, 11.1.

EXAMPLE 28

Step (a).—DL-N-tert.-butoxycarbonyl-aminooxy-phenyl-acetic acid-2-methoxyanilide 1.07 g. (0.0039 M) of DL-N-tert.-butoxycarbonyl-aminooxy-phenylacetic acid, 0.60 g. (0.0039 M) of N,N'-dicyclohexyl carbodiimide and 0.31 ml. (0.0038 M) of o-anisidine are reacted as described in Example 1 Method (a2). The working up of the reaction mixture is also the same. 1.14 g. (81%) of DL-N-tert.-butoxycarbonyl-aminooxy-phenylacetic acid-2-methoxy-anilide are obtained, M.P.: 128–130° C., $R_f$: 0.70.

Analysis.—Calculated (percent): C, 64.5; H, 6.5; N, 7.5. Found (percent): C, 64.35; H, 6.4; N, 7.4.

Step (b).—DL-aminooxy-phenylacetic acid-2-methoxyanilide hydrochloride 0.80 g. (0.0021 M) of DL-N-tert.-butoxycarbonyl-aminooxyphenylacetic acid-2-methoxyanilide are treated with 4.0 ml. of a 4 M ethyl acetate solution of hydrochloric acid as described in Example 1 Step (d). 0.52 g. (80%) of DL-aminooxy-phenylacetic acid-2-methoxyanilide hydrochloride are obtained, M.P.: 170–172° C.

Analysis.—Calculated (percent): C, 58.4; H, 5.5; Cl, 11.5. Found (percent): C, 58.4; H, 5.7; Cl, 11.5.

EXAMPLE 29

Step (a).—DL-N-tert.-butoxycarbonyl-aminooxy-phenyl-acetic acid-3-bromoanilide 1.96 g. (0.0073 M) of DL-N-tert.-butoxycarbonyl-aminooxy-phenylacetic acid, 0.77 ml. (0.007 M) of m-bromoaniline and 1.50 g. (0.0073 M) of N,N'-dicyclohexyl carbodiimide are reacted as described in Example 1 Method (a2). 2.32 g. (84.5%) of DL-N-tert.-butoxycarbonyl-aminooxy-phenylacetic acid-3-bromo-anilide are obtained, M.P.: 117–119° C., $R_f$: 0.81.

Analysis.—Calculated (percent): C, 55.0; H, 5.4; N, 7.1; Br, 17.5. Found (percent): C, 55.1; H, 5.4; N, 7.1; Br, 17.4.

Step (b).—DL-aminooxy-phenylacetic acid-3-bromo-anilide hydrochloride 1.22 g. (0.0031 M) of DL-N-tert.-butoxycarbonyl-aminooxyphenylacetic acid-3-bromoanilide are treated with 10.0 ml. of a 4 M ethyl acetate solution of hydrochloric acid as described in Example 1 Step (d). The working up of the reaction mixture is also the same. 0.73 g. (66.5%) of DL-aminooxy-phenylacetic acid-3-bromo-anilide hydrochloride are obtained, M.P.: 162–163° C.

Analysis.—Calculated (percent): C, 47.1; H, 4.0; N, 7.8; Br, 9.95. Found (percent): C, 46.9; H, 4.1; N, 7.8; Br, 10.0.

EXAMPLE 30

N-(alfa-aminooxy-propionyl)aminooxy-acetic anilide hydrochloride 2.27 g. (0.005 M) of alfa-N-tert.-butoxycarbonyl-aminooxy-propionic acid pentachlorophenyl ester are dissolved in 20 ml. of abs. dimethylformamide. The temperature of the reaction mixture is kept at 20° C., and 1.01 g. (0.005 M) of aminooxy-acetic anilide hydrochloride and 0.70 ml. (0.005 M) of abs. triethylamine are added. The mixture is allowed to stand at room temperature for 18 hours, then the separated triethylamine hydrochloride is filtered off, and the filtrate is evaporated under reduced pressure in a water bath heated to 50° C. The residue is dissolved in 30 ml. of ethyl acetate, and the solution is washed successively with 3× 7 ml. of 1 N hydrochloric acid, 10 ml. of water, 3× 7 ml. of 1 M sodium bicarbonate solution and 10 ml. of water. Thereafter the organic layer is dried over sodium sulfate and evaporated in vacuo. The residue is treated with 10.0 ml. of a 4 M ethyl acetate solution of hydrochloric acid. This mixture is stirred at room temperature for 20 minutes, with the exclusion of the moisture of air. Thereafter 50.0 ml. of abs. diethylether are added to the solution, the separated crystals are filtered off, dried and recrystallized from a mixture of ethanol and diethylether. 1.15 g. (79.5%) of N-(alfa-aminooxy-propionyl)-aminooxy-acetic anilide hydrochloride are obtained, M.P.: 148–151° C. $(\alpha)_D^{32} = +58.5°$ (c.=1.5, ethanol).

Analysis.—Calculated (percent): C, 47.3; H, 5.4; N, 14.0; Cl, 11.9. Found (percent): C, 47.2; H, 5.6; N, 14.1; Cl, 12.1.

EXAMPLE 31

N-carbamoyl-aminooxy-acetic anilide 1.40 g. (0.0075 M) of aminooxy-acetic anilide hydrochloride are dissolved in 7.0 ml. of water, and 7.5 ml. of 1 N hydrochloric acid are added to the solution. Thereafter 0.67 g. (0.00825 M) of potassium cyanate are added portionwise to the mixture with stirring at room temperature. The mixture is stirred for additional 30 minutes at room temperature, the separated crystals are filtered off, washed with water, dried and recrystallized from ethanol. 1.26 g. (81%) of N-carbamoyl-aminooxy-acetic anilide are obtained, M.P.: 134–135° C.

*Analysis.*—Calculated (percent): C, 51.6; H, 5.3; N, 20.1. Found (percent): C, 51.6; H, 5.4; N, 20.1.

EXAMPLE 32

N-carbamoyl-aminooxy-acetic acid-2-methoxyanilide 2.15 g. (0.010 M) of aminooxy-acetic acid-2-methoxy-anilide hydrochloride are dissolved in 10 ml. of water, and 10 ml. of 1 N hydrochloric acid are added to the solution. Thereafter 0.89 g. (0.011 M) of potassium cyanate are added portionwise, with stirring to the mixture at room temperature. The reaction mixture is worked up as described in Example 31. 1.80 g. (75%) of N-carbamoyl-aminooxy-acetic acid-2-methoxy-anilide are obtained, M.P.: 151–152° C.

*Analysis.*—Calculated (percent): C, 50.2; H, 5.5; N, 17.5. Found (percent): C, 50.3; H, 5.6; N, 17.4.

EXAMPLE 33

Aminooxy-acetic acid-tert.-butylamide hydrobromide 4.73 g. (0.010 M) of N-benzyloxycarbonyl-aminooxy-acetic acid pentachlorophenyl ester are dissolved in 25 ml. of abs. dioxane. 1.25 ml. (0.012 M) of tert.-butylamine are added to the solution, and the mixture is allowed to stand at room temperature for 24 hours. The solvent is distilled off under reduced pressure in a water bath heated to max. 50° C. The residue is dissolved in 30 ml. of ethyl acetate, and the solution is washed successively with 3× 10 ml. of 1 N hydrochloric acid and 10 ml. of water. The solution is dried over sodium sulfate, the solvent is distilled off, and the residue is added to 5.0 ml. of a 3.5 M glacial acetic acid solution of hydrobromic acid. The solution is stirred for 30 minutes at room temperature with the exclusion of the moisture of air. 50 ml. of abs. diethylether are added to the solution, the separated crystals are filtered off, and recrystallized from a mixture of ethanol and ether. 0.75 g. (51%) of aminooxy-acetic acid-tert.-butylamide hydrobromide are obtained, M.P.: 143–144° C., $R_f$: 0.18 (developing mixture:

ethylacetate:pyridine:glacial acetic acid:water=18:6:1.8:3.3, adsorbent: silica gel).

*Analysis.*—Calculated (percent): C, 49.0; H, 10.3; Br, 19.1. Found (percent): C, 48.9; H, 10.4; Br. 19.1.

EXAMPLE 34

Alfa-aminooxy-ε-amino-capronic anilide dihydrobromide 3.16 g. (0.0054 M) of alfa-N-tert.-butoxycarbonyl-aminooxy-ε-N'-benzyloxycarbonyl-amino-capronic acid dicyclohexylammonium salt are suspended in 50 ml. of diethylether, and the suspension is extracted with 4× 30 ml. of 0.2 N sulfuric acid. The organic layer is dried over sodium sulfate, and the solvent is distilled off under reduced pressure. The obtained 2.20 g. oily residue is dissolved in 15.0 ml. of abs. dioxane, the solution is cooled to +5° C., and 0.51 ml. (0.0054 M) of aniline and 1.12 g. (0.0054 M) of N,N'-dicyclohexyl carbodiimide are added to the solution. The cooling bath is removed, and the mixture is allowed to stand at room temperature for 16 hours. The separated 1.10 g. (91%) of N,N'-dicyclohexyl urea are filtered off, and the filtrate is evaporated under reduced pressure in a water bath heated to 50° C. The residue is dissolved in 20 ml. of ethyl acetate, and the solution is extracted successively with 2× 5 ml. of 1 N hydrochloric acid, 5 ml. of water, 2× 5 ml. of 1 M sodium bicarbonate solution and 5 ml. of water. The organic layer is dried over sodium sulfate, and the solvent is distilled off under reduced pressure. The residue is dissolved in hot chloroform, and an equal quantity of n-hexane is added to the solution. The solution is cooled, the separated crystals are filtered off and dried. 1.54 g. (61%) of the intermediate product are obtained, M.P.: 64–65° C. $(\alpha)_D^{28}=+66°$ (c.=1, ethanol), $R_f$: 0.78.

1.0 g. (0.0021 M) of the thus obtained product is added to 10.0 ml. of a 3.5 M glacial acetic acid solution of hydrobromic acid. The mixture is stirred for 30 minutes at room temperature, thereafter 100 ml. of abs. diethylether are added, the separated hygroscopic substance is filtered off, and recrystallized from a mixture of ethanol and diethyl ether. 0.62 g. (74%) of alfa-aminooxy-ε-amino-capronic anilide dihydrobromide are obtained, M.P.: +130° C. (decomposition) $(\alpha)_D^{28}=+31°$ (c.=1, ethanol).

*Analysis.*—Calculated (percent): C, 36.1; H, 5.3; Br, 40.1. Found (percent): C, 36.1; H, 5.4; Br, 40.2.

What we claim is:
1. Aminooxy-acetic acid anilide.
2. Aminooxy-acetic acid-2-methoxyanilide.
3. Aminooxy-acetic acid cyclopentylamide.
4. Alfa-aminooxy-beta-phenyl-propionic anilide.

References Cited

UNITED STATES PATENTS 3,420,817    1/1969    Stempel et al. _____ 260—562

OTHER REFERENCES

Chemical Abstracts, vol. 59, col. 9851–52 (1963) (Nicholaus article).

Stempel et al.: J. Org. Chem., vol. 33, pp. 2963–66 (1968).

Stempel et al.: J. Org. Chem., vol. 32, pp. 2417–25 (1967).

HARRY I. MOATZ, Primary Examiner

U.S. Cl. X.R.

260—140, 295 CA, 295 AM, 453 R, 471 C, 471 R, 482 C, 519, 534 M, 561 R, 562 R, 562 A; 424—298, 320, 324